July 12, 1932.   W. A. BLUME   1,867,348
FRICTION BRAKE
Filed March 2, 1929
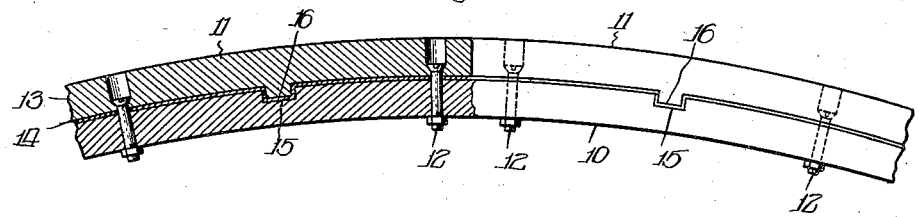
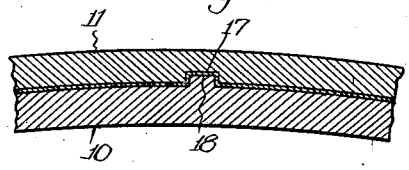
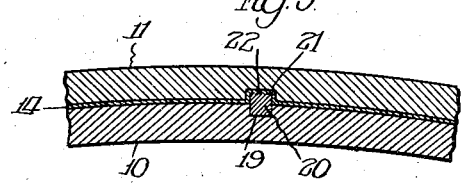
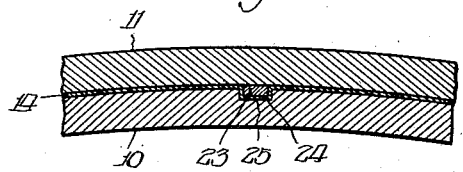
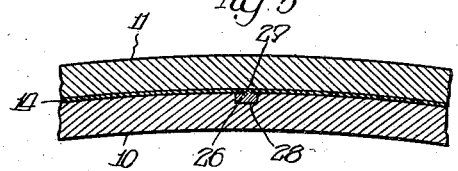
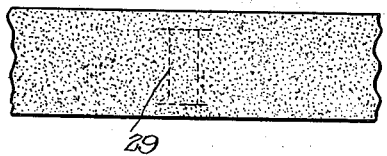
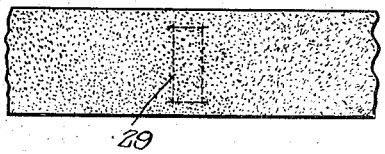
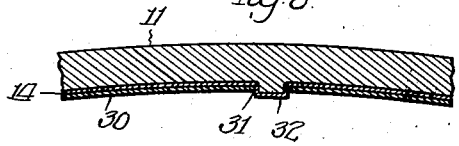
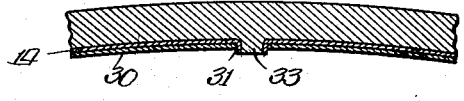
Inventor:
William A. Blume
By Wm. O. Beck  Atty.

Patented July 12, 1932

1,867,348

UNITED STATES PATENT OFFICE

WILLIAM A. BLUME, OF DETROIT, MICHIGAN, ASSIGNOR TO AMERICAN BRAKE MATERIALS CORPORATION, OF NEW YORK, N. Y., A CORPORATION OF NEW YORK

FRICTION BRAKE

Application filed March 2, 1929. Serial No. 343,964.

This invention relates to friction brakes and its primary object is to provide an interengagement between the brake blocks and the supports therefor to prevent the fastening means from being sheared during the use of the brakes.

A further object is to provide novel and simple means for preventing relative movement of a friction block on its support and thereby protect the fastening means from shearing action which might otherwise result during use of the brake.

In the accompanying drawing I have illustrated the invention in simple embodiments and referring thereto Fig. 1 is a part sectional view illustrating one form of the invention.

Figs. 2-5 are sectional views illustrating other forms of the invention.

Fig. 6 is a plan view and Fig. 8 is a sectional view illustrating the invention applied to a brake band.

Fig. 7 is a plan view and Fig. 9 is a sectional view illustrating another application of the invention to a brake band.

Referring to the drawing 10 represents a support for shoes 11 which are secured to the support by bolts 12. The support 10 is represented as a shoe for an internal expansion brake but the invention may be applied to any form of support, a shoe, a head or a band for an internal or an external brake and of any kind for which the invention is or may be adapted. I have also indicated a block having a composition body 13 and a metal back 14. The support and the block are provided with interengaging transversely disposed parts to relieve the bolts of shearing action which might otherwise result during application of the brake. In Fig. 1 the support is provided with a transverse groove 15 and the block is provided with a corresponding key 16 which fits snugly in the groove 15 and prevents relative movement of the block lengthwise on the support. The metal back 14 is bent to receive the body material of the block for forming the key 16 which, in this embodiment, is an integral part of the block. In Fig. 2 the interengaging parts as shown in Fig. 1 are reversed, the groove 17 being provided in the block to receive the integral key 18 on the support. In Fig. 3 the support has the transverse groove 19 to receive the key 20 which is a bar seated in a groove 21 in the block and preferably spot welded to the metal back 14. In Fig. 4 the metal back 14 is bent to receive a bar 23 and together they form a key 24 to engage the groove 25 in the support.

In Fig. 5 a bar 26 is spot welded at 27 to the back 14 and engages the groove 28 in the support. The groove may extend entirely across the support and the key may extend entirely across the block, or they may terminate inside of the side edges of the support and block as indicated in broken lines 29 in Figs. 6 and 7. These Figs. 6, 7, and Figs. 8 and 9 show how the invention may be embodied in blocks and brake bands, the bands 30 having openings 31 corresponding to the grooves in the solid form of supports shown in Figs. 1-5 to receive the keys 32, 33. The key 32 corresponds with the key 16 in Fig. 1 and projects through the opening 31 in the band. The key 33 is formed by stamping the back 14 and pressing down the edges thereof, the body of the block filling the opening formed thereby to provide a transverse key of the same general character as shown in Fig. 1.

The bolts fasten the block to the support but they are liable to be sheared under repeated brake applications unless some other means is provided to anchor the block to the support against relative lengthwise movement under braking pressure. The interlocking engagement provided by the transverse key and groove constitutes a simple form of anchoring means to anchor the block on the support against that relative movement which would tend to shear the fastening means. These fastening means are shown in the simple form of bolts but they may be rivets or any other devices which have been or may be used for this purpose and with which the invention may functionally operate.

The invention is capable of use with friction blocks of different kinds and although I have shown it embodied with a block having a composition body and a metal back it is not necessarily restricted to this particular embodiment. The block may be in any desired shape or size; a plurality of independent blocks may be arranged end to end, or a continuous elongated block may be used; the block may be relatively thick if used, for example, in heavier vehicles, or it may be relatively thin if used, for example, in lighter vehicles. The block may be an elongated strip fastened to a brake band or other support. The invention may be embodied in a variety of specified forms, some of which I have indicated in the drawing, and I reserve the right to make all such changes in the form, construction and adaptations of the invention within the scope of the following claims.

I claim:

1. In a friction brake, the combination of a detachable friction block comprising a body and a back united therewith, a support for the block, and fastening devices passing directly through said body and back and support from front to back thereof for securing the block to the support, there being interlocking parts between said block and support other than and disposed intermediate of said fastening devices to prevent movement of the block on the support which would tend to shear the fastening devices.

2. In a friction brake, the combination of a detachable friction block comprising a body and a back united therewith, a support for the block, and fastening devices passing directly through said body and back and support from front to back thereof for securing the block to the support, said block and support having substantially rectangular and transversely disposed interlocking parts intermediate the fastening devices to prevent movement of the block on the support which would tend to shear the fastening devices.

3. In a friction brake, the combination of a detachable friction block element, a support element for the block element, and fastening devices for attaching the block element to the support element, one of said elements having a substantially rectangular key projecting from the face thereof engaging the other element and the other element being shaped to receive said key for interlocking said elements to prevent movement of the block element on the support element which would tend to shear the fastening devices.

4. In a friction brake, the combination of a detachable friction block element comprising a body and a back united therewith, a support element for the block element, and fastening devices passing directly through said body and back and support from front to back thereof for securing the block element to the support element, one of said elements having a substantially rectangular transverse groove and the other element having an integral key projecting from the face thereof engaging the other element and engaging said groove to prevent movement of the block element on the support element which would tend to shear the fastening devices.

5. In a friction brake, the combination of a detachable friction block, a support for the block, fastening devices for attaching the block to the support, said block and said support having co-operating recesses in the engaging faces thereof, and means in said recesses adapted to prevent movement of the block on the support which would tend to shear the fastening devices.

6. In a friction brake, the combination of a detachable block including a body and a reenforcing back, a support for the block, and fastening devices for attaching the block to the support, said body and back and said support including interlocked transversely extending portions for preventing a movement of the block on the support which would tend to shear the fastening devices.

7. In a friction brake, the combination of a detachable friction block having a body, a support for the block, fastening devices for attaching the block to the support, there being interlocking parts on the block and support to prevent movement of the block on the support which would tend to shear the fastening devices, and said block including a reenforce back united therewith and overlying said interlocking parts.

8. In a friction brake, the combination of a detachable friction block element having a body, a support element for the block, fastening devices for attaching the block to the support, one of said elements having a key and the other element having a groove to receive the key for interlocking said elements to prevent movement of the block on the support which would tend to shear the fastening devices, and said block including a reenforce back united therewith and interposed between the key and the groove.

WILLIAM A. BLUME.